United States Patent [19]

Kronseder

[11] Patent Number: 5,598,859
[45] Date of Patent: Feb. 4, 1997

[54] CLEANING MACHINE FOR RECEPTACLES

[75] Inventor: Hermann Kronseder, Regensburger, Germany

[73] Assignee: Krones AG Hermann Kronseder Maschinenfabrik, Neutraubling, Germany

[21] Appl. No.: 571,399

[22] Filed: Dec. 13, 1995

[30] Foreign Application Priority Data

Dec. 16, 1994 [DE] Germany ........................ 44 45 016.8
Apr. 12, 1995 [DE] Germany ...................... 195 13 221.1

[51] Int. Cl.⁶ ........................................ B08B 9/08
[52] U.S. Cl. ........................... 134/62; 134/68; 134/72; 134/152; 198/404; 198/803.8
[58] Field of Search ................... 134/61, 62, 66, 134/68, 69, 70, 71, 72, 134, 48, 67, 131, 152; 294/99.1; 198/404, 803.8

[56] References Cited

U.S. PATENT DOCUMENTS

| | | | |
|---|---|---|---|
| 763,174 | 6/1904 | Goebel | 134/71 |
| 1,958,846 | 5/1934 | Christensen . | |
| 1,972,711 | 9/1934 | Kendall . | |
| 2,634,737 | 4/1953 | Rowe | 198/803.8 |
| 2,661,883 | 12/1953 | Francisco | 294/99.1 |
| 2,896,647 | 7/1959 | Thompson, Jr. | 198/404 |
| 3,208,579 | 9/1965 | Perrier et al. . | |
| 3,614,958 | 10/1971 | Perrier | 134/68 |
| 4,080,974 | 3/1978 | Oag | 134/68 |
| 4,104,081 | 8/1978 | Totten | 134/62 |
| 4,635,662 | 1/1987 | Totten | 134/68 |
| 4,667,690 | 5/1987 | Hartnig | 134/62 |
| 5,277,207 | 1/1994 | Perrier | 134/62 |

FOREIGN PATENT DOCUMENTS

| | | | |
|---|---|---|---|
| 18869 | 4/1978 | Australia | 134/62 |
| 2417469 | 10/1979 | France | 134/68 |
| 8116802 | 9/1981 | France . | |
| 477649 | 6/1929 | Germany | 134/61 |
| 1211101 | 2/1966 | Germany | 294/99.1 |
| 4022486C1 | 7/1990 | Germany . | |
| 4131699A1 | 9/1991 | Germany . | |
| 4204884A1 | 2/1992 | Germany . | |
| 103071 | 11/1962 | Netherlands | 198/803.8 |
| 295708 | 5/1965 | Netherlands | 294/99.1 |
| 2188309 | 8/1987 | United Kingdom | 134/62 |

*Primary Examiner*—Frankie L. Stinson
*Attorney, Agent, or Firm*—Ryan, Maki, Mann & Hohenfeldt

[57] ABSTRACT

Bottles to be cleaned are fed in succession to an infeed starwheel from which they are transferred to a rotor on which there are circumferentially spaced apart cam operated bottle inverting devices that grip the bottles and invert them with their mouths over a nozzle that injects cleaning fluid into them. The gripping devices have on them gripper fingers which are V-shaped and are molded, respectively, of a resilient and deflectable synthetic resin such as a polyamide. There is an upper gripper having finger tips spaced apart to engage the neck of a bottle and a lower gripper having finger tips or the like that grip or support the cylindrical body of the bottle.

13 Claims, 4 Drawing Sheets

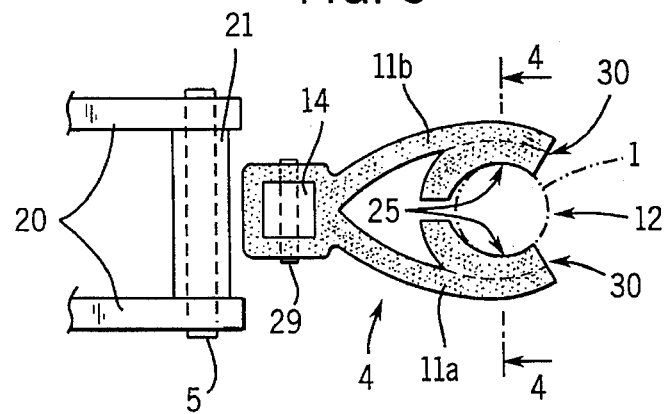
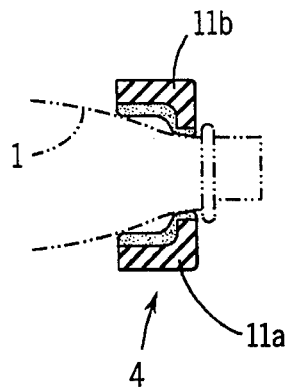
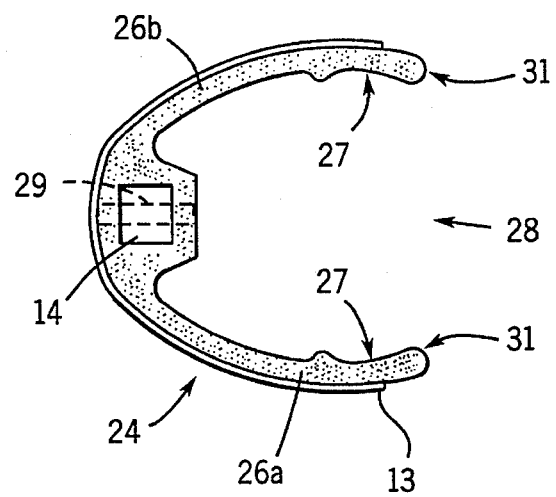

CLEANING MACHINE FOR RECEPTACLES

BACKGROUND OF THE INVENTION

The invention disclosed herein pertains to a machine for cleaning receptacles such as plastic and glass bottles. For convenience, the term "bottles" will be used herein as the generic designation for all glass and plastic receptacles that the machine is capable of cleaning.

In a bottle filling plant, machines which are called rinsers, are utilized to inject various fluids, including water, air and vapor into bottles to sterilize them. Good cleaning of the machine itself is required in order to avoid contamination of the treated bottles in the environment of the machine.

In a known cleaning machine of the above described type, each bottle gripping plier comprises two articulated clamping levers biased by a spring in the direction of closure, with the one clamping lever being rotatably supported directly on a swivelling axis. This clamping lever is provided with two rotatable cam rollers which follow over a spatially curved, stationary radial cam to control the swivel motion of each gripping plier. The other clamping lever also carries a rotatable cam roller which scans a stationary cam for the bottles disposed in the region of the feed and removal device and in this way controls the opening and closing movement of the gripping pliers. (FR-OS 2 489 802). After closure of the gripping pliers, the bottles are clasped at the neck below the thickened head and are held exclusively by the tension force of the springs. The gripping pliers of these known cleaning machines are very expensive to manufacture mostly due to the large number of joints, cam rollers and radial cams. These complex contrivances are, moreover, difficult to clean and difficult to keep in sterile condition.

In another known bottle cleaning machine, two clamping levers of each gripping plier are connected by articulated levers which are prestressed by a spring in the direction of closure (DE-PS 40 22 486). Through a single stationary radial cam and special intermediate transmission the swivel motion of the gripping pliers as well as also the opening and closing motion of the clamping levers are controlled. Still the cost of manufacturing the gripping pliers is relatively high and cleaning the gripping pliers is very cumbersome.

SUMMARY OF THE INVENTION

The invention is directed to lowering significantly the cost of manufacturing grippers used in bottle cleaning machines and to provide bottle grippers that are easy to clean by virtue of their not heretofore attained simplicity. Moreover, according to the invention, no radial cam for opening or closing the bottle grippers is required. The new grippers are also reliable because they match the contour of the neck and the body of the bottles at the gripping interface.

How the foregoing new features of the cleaning machine are achieved will appear in the more detailed description of the invention which will now be set forth in reference to the accompanying drawings.

DESCRIPTION OF THE DRAWINGS

FIG. 3 is a top plan view of the upper gripper device which is utilized to grip the neck of a bottle in preparation for inverting the bottle to inject cleaning fluid into it;

FIG. 4 is a fragmentary sectional view taken on the line corresponding to 4—4 in FIG. 3;

FIG. 5 is a top plan view of the bottle gripper which is depicted in FIG. 2 and is utilized to grip the body of the bottle;

DESCRIPTION OF A PREFERRED EMBODIMENT

Figure 1:
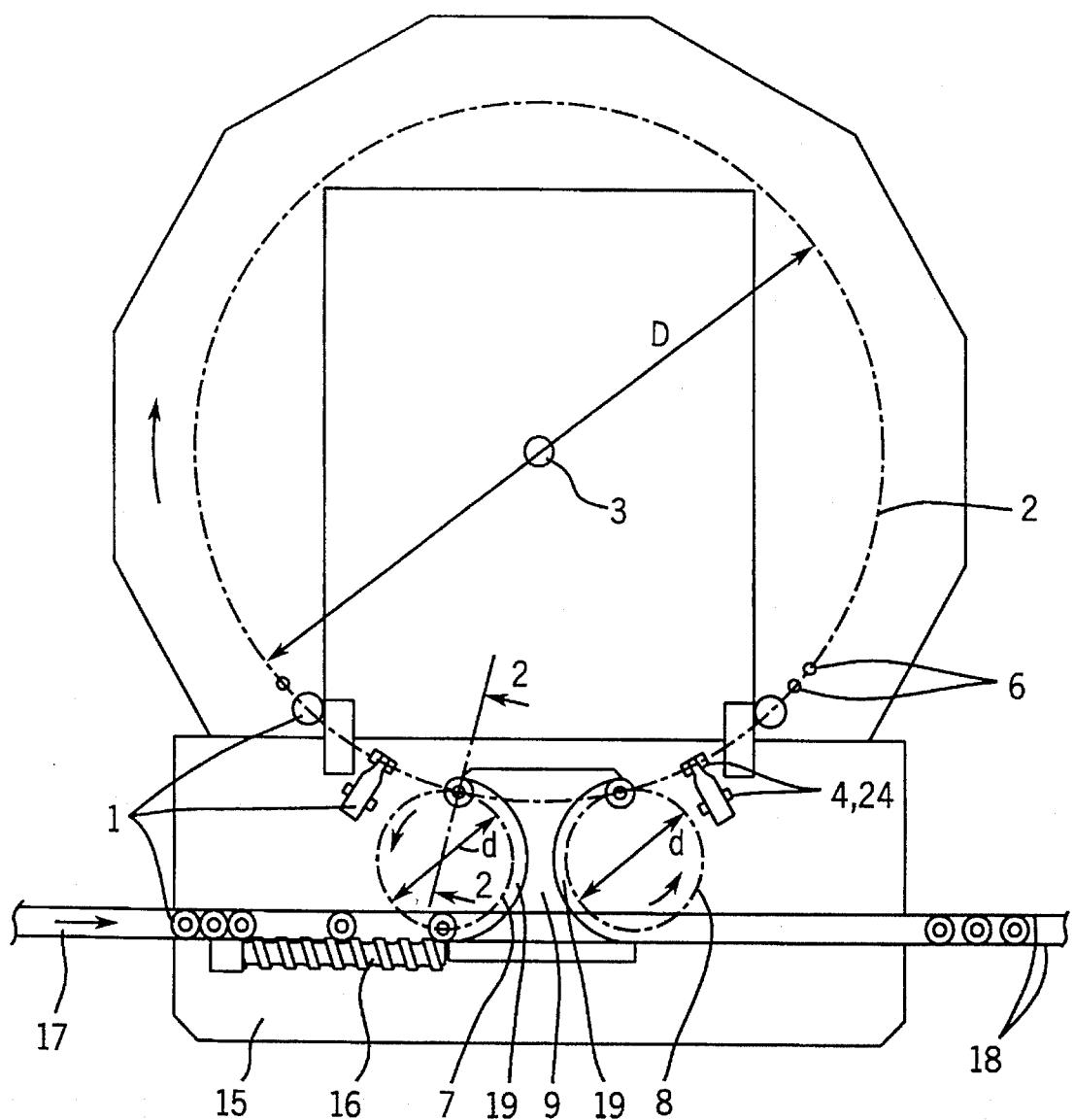
FIG. 1 is a schematic top plan view of a bottle cleaning machine that embodies the invention.

The bottle cleaning machine depicted in FIGS. 1–5 is adapted to inject fluids such as sterile water into inverted bottles to rinse and sterilize them. The machine comprises a housing 15. A rotor 2 having a vertical axis of rotation 3, an inlet starwheel 7 and an outlet starwheel 8, each having a vertical axis of rotation, and a bottle infeed worm 16, turning on a horizontal axis, are mounted to the top of the housing 15. These bottle transport members 2, 7, 8, and 16 are driven in the direction of the arrow in synchronism with each other by a drive system, not shown. The dash-dot semicircular pockets "d" of the inlet starwheel 7 and the outlet starwheel 8 are tangent to dash-dot circle D along which the inverted bottles are transported by rotor 2. Horizontal conveyor belt 17, driven in the direction of the arrow, conveys the bottles to and from the machine. The bottles are stabilized on the conveyor belt by lateral guide rails 18. The bottles are guided in the region of inlet starwheel 7 and the outlet starwheel 8 by a guide 9 having an hourglass configuration which has arcuate sides. When the bottles are discharged from the infeed worm 16 they land on a curved surface 19 on which they are taken under control by the infeed starwheel. Likewise, when the bottles are discharged from the rotor path 2, they are taken under the control of the outfeed starwheel which moves the sterilized bottles 1 onto belt conveyor 17 for being transported away from the cleaning machine.

A plurality of upwardly directed nozzles 6 are arranged in a circle concentric to and outside of the circular path 2 along which the bottles are transported on the rotor. Nozzles 6 project a jet of sterilized water upwardly into the interior of bottles 1 as they are transported along the circular path. The valves for timing the turn-on and turn-off of the jets are not shown since they can easily be designed by a skilled mechanic.

A fork-shaped bearing bracket 20 is mounted on rotor 2 above each nozzle 6. The free ends of the two armed bracket are directed radially outwardly and support a swivel axle 5 which is tangential to the circumference of rotor 2. On the swivel axle 5 is rotatably supported a block 21 on whose lower side is fastened a forked member 22 extending obliquely inwardly and downwardly. The forked member 22 is constrained to follow a stationary radial cam ring 23 comprised of a spatially curved continuous round rod. The rod 23 is held by way of a plurality of supports (not shown) on the circumference of rotor 2 and, together with the forked members 22, forms a control device for the swivel motion of upper and lower bottle gripping device 4, 24, respectively.

On the side of each block 21 there is a holder or post 14. The holder 14, in the form of a square rod, in its normal position shown in FIG. 2 projects downwardly. Detachably fastened to holder 14 by way of cross pins 29 are an upper gripper 4 and a lower gripper 24. The upper gripper 4, or plier as it is otherwise called, is arranged at the level of the tapered neck of the bottle closely below the bottle mouth. The lower gripper or plier 24 is at the level of the cylindrical body of a bottle 1 which is on arcuate bottle support slide 19. The upper and lower grippers 4 and 24 are both formed of a single piece and comprise a wear-resistant synthetic resin material such as a polyamide, by way of example and not limitation. The resin can be fiber reinforced as long as it can be flexed.

As shown in FIG. 3, the upper gripper 4 has a generally Y-shaped configuration. The base of the gripper 4 is provided with a square hole and is mounted by means of pin 29 onto holder 14 that has a square cross section. Two slightly curved gripping fingers 11a and 11b extend symmetrically from the base. Each finger has an approximately quarter circle recess 25 for engaging a circular bottle neck. Between the two clamping or gripping fingers 11a and 11b there is an opening 12 which allows the neck of a bottle 1 to enter between the fingers 11a and 11b for being gripped and allows the gripper 4 to release the bottle. Adjoining the recesses 25 the clamping or gripping fingers 11a and 11b are provided with angulated ends 30 which facilitate guidance of the bottles 1 between the fingers. In the relaxed state, as is shown in FIG. 3, the maximum distance between the recesses 25 is slightly less than the diameter of the bottle neck, which is in dot-dash lines, and the gripper fingers 11a and 11b in the inner region of the recesses 25 face away from the opening 12.

Figure 2:
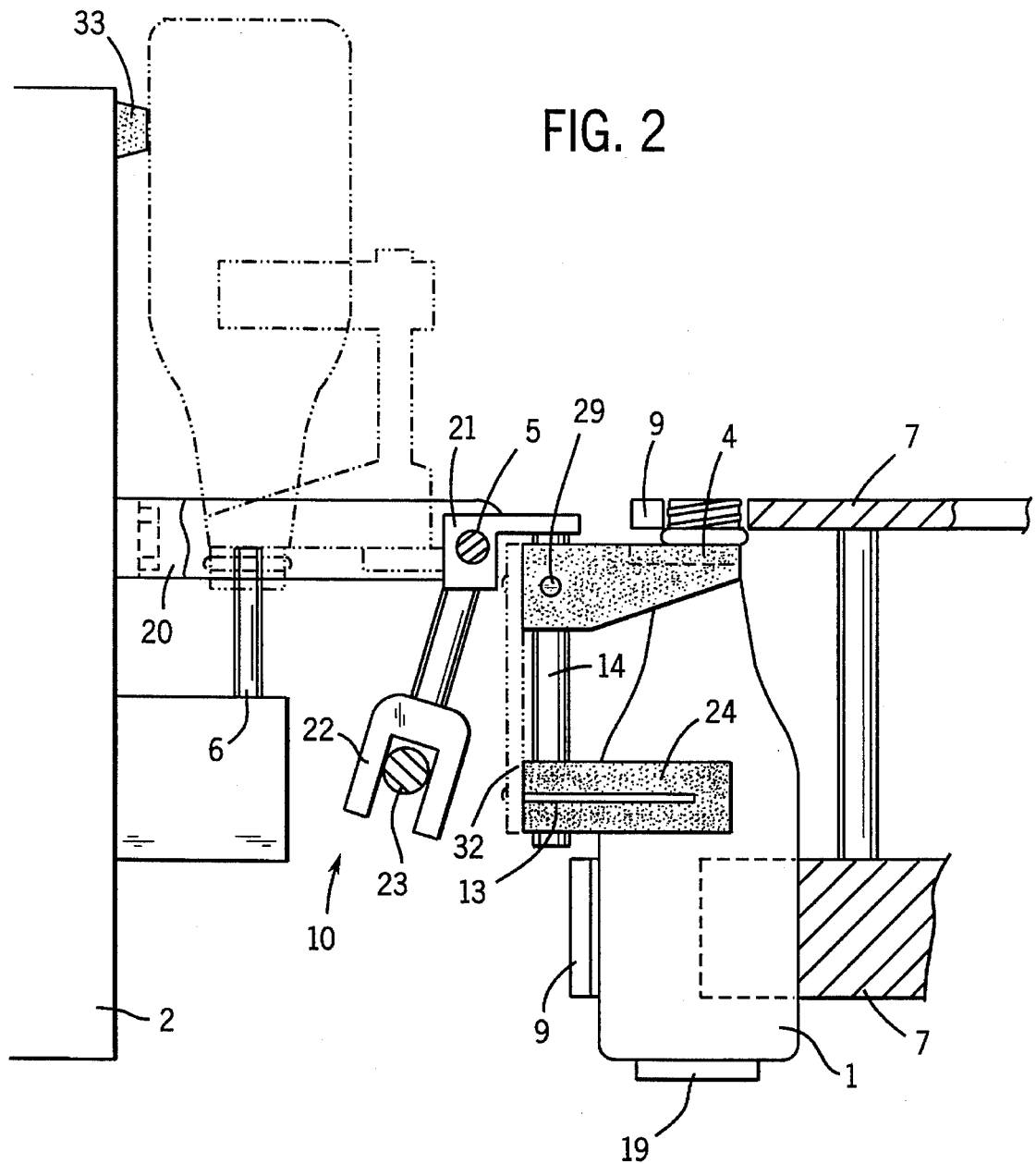
FIG. 2 is a side elevational view of the new bottle gripping and handling device, partly in section, taken on a line corresponding with 2—2 in FIG. 1 and enlarged in comparison to the preceding figure.

As shown in FIGS. 2 to 4, the gripper fingers 11a and 11b, starting at the base to which they are connected and up to approximately their centers have a rectangular cross section with decreasing height. The region of the rectangular cross section forms a type of compound spring which, on the one hand, due to the elasticity of the synthetic material of which the fingers are composed, makes possible the flexing of the gripping fingers 11a and 11b, and generates the tension force when it is bent open or spread open by the bottle neck. The adjoining region of the fingers 11a and 11b with the base of gripper 4 does not participate significantly in the elastic deformation of the fingers. Through this division of function an optimum flexibility as well as clamping or gripping effect is attained. In addition, through the reinforcement or thickening of the fingers in the region of recesses 25 supporting the bottle 1 in the conical neck region is possible, as is shown in FIG. 4. This imparts further stability to the bottle 1 in the fingers of gripper 4 and prevents vertical slipping and/or dropping of the bottle when the bottle 1 is inverted while the bottle being held between the fingers 11a and 11b. The gripper 4 can be produced extremely cost-effectively by utilizing injection molding and, due to its smooth, open and seamless construction, can be cleaned and kept sterile thoroughly and easily.

The lower gripper device 24 is also implemented integrally and produced of a dimensionally stable elastic synthetic resin material of suitable stiffness.

The lower gripper device 24, shown in FIG. 5, is also molded in a single piece composed of synthetic resin or plastic having appropriate stiffness and hardness. The base of gripper 24 has a square hole for mounting it to holder rod 14 by means of a pin 29. Two slightly flexible gripping fingers 26a and 26b extend from the base of gripper 24. Both fingers 26a and 26b have a rectangular cross section and have identical height. The inner sides of the fingers 26a and 26b which face each other have near their free end regions opposed curved recesses 27 which more or less interface in conformity with the circular body of a bottle. The distance between both recesses 27 in the relaxed state of the fingers 26a and 26b of gripper 24 without the cylindrical body of a bottle 1 between the fingers is less than the diameter of the bottle body. If a bottle is disposed between the fingers, the two fingers spread open elastically, thereby generating the desired clamping force. As was the case with upper gripper 4, bottles 1 are consequently held at their bodies under laterally applied force. The free ends of both gripping fingers 26a and 26b are provided with rounded tips 31 to facilitate entrance and exit of bottles 1 through the gap or opening 28 formed between them. The lower gripper 24 can also be produced by molding as a single piece at low cost. As is true of the upper bottle neck gripper 4, it is easy to clean and sterilize the lower bottle body gripper 24 too.

The clamping or gripping force can be increased in a simple way by placing a U-shaped metal spring 13 into a groove extending along the outer side of gripping plier 24. By using different springs 13, adaption to various operating conditions and bottle diameters can be made with little effort and little expenditure of time. It should be understood that u-shaped spring, not shown, may also be used on the upper gripper 4 which is shown in FIGS. 3 and 4. The spring can be molded and imbedded into place concurrently with molding the gripper.

The grippers 4 and 24 described above can be rapidly and effortless exchanged after extended use or when converting to another type of bottle by removing the cross pins 29 and pulling holder 14 downwardly. The conversion can be simplified further if the upper gripper 4 and the lower gripper 24 belonging to a particular bottle type are coupled through a connecting plate 32, shown in FIG. 2 in dot-dash lines, to form a structural unit. It is understood, that other holding means such as clamping screws, snap closures etc. can be employed to unify the two grippers.

Except for the cam 23 and follower 22 comprising control device 10 for swivelling of the grippers, 4 and 24, no further control devices are needed since, according to the invention, the bottle gripping operation is controlled by the bottles 1 themselves as is shown in the following functional description of the cleaning machine according to FIGS. 1 to 5.

With the rotor being driven rotationally and with bottles being advanced on the conveyor belt 17, the bottles 1 standing upright are metered in by the infeed worm 16 and subsequently sequentially accepted by inlet starwheel 7 and moved toward the continuously rotating rotor 2. In the process, the bottles 1 slide on the curved guide plate 19 and are guided precisely by the lower plate of inlet starwheel 7 and the lower guidance arc 9 in the body region and by the upper plate of the inlet starwheel 7 and the upper arc of guidance arc 9 at the level of the bottle head. Upon approaching the rotor 2, a bottle 1 gradually penetrates into opening 12 between the fingers of the upper gripper 4 or opening 28 of the lower gripper 24 and lastly comes into direct contact with the angulated tips 30 of the upper gripper 4 or the rounded-off faces 31 of the lower gripper 24. The circular paths of the grippers 4 and 24 and of the bottle 1 approach one another further and the gripper fingers 11a and 11b of the upper gripper 4 and the fingers 26a and 26b of the lower gripper 24 are directly spread open by bottle 1. Due to the geometric configuration of the recesses 25 and 27, initially a region of maximum bending results when bottle 1 is located precisely at the outer end regions of recesses 25 or 27. After the bottle 1 is completely and fully within recesses 25 or 27, respectively, the fingers 11a and 11b or 26a and 26b, respectively, spring slightly back but, compared to their relaxed normal state, are still bent outwardly so that a sufficient gripping force remains for reliable clamping of bottle 1.

In addition, complementary form-fit holding between the gripper fingers and the bottle contour results because of the partial circular recesses 25 and 27, respectively, and because the width of the openings 12 and 28, respectively, even when the grippers 4 and 24, respectively, are under tension, is smaller than the diameter of bottle 1 in the region in which it is held. Stated differently, the recesses 25 and 27 extend on both sides of a connecting diameter line parallel to the swivel axle 5 and the recesses 25 are slightly shifted toward the inside relative to the diameter line and the recesses 27 are approximately symmetrical to it.

The above described clamping of a bottle 1 by spreading of the clamping or gripping fingers 11a and 11b or 26a and 26b, respectively, is completed when the center of a particular bottle 1 reached the connecting line between the axis of rotation 3 of the rotor 2 and the axis of rotation of the inlet starwheel 7. This position is shown in FIG. 2. At this site the curved side rail 19 and the guide arc 9 terminate. Directly thereon the block 21 with the grippers 4 and 24 and the clamped bottle 1 is swivelled by the control device 10 through 180 degrees upwardly into the position as shown in FIG. 2 in dot-dash lines. The mouth of the bottle which is now directed downwardly, is now disposed centrally above the injection jet 6 and the injection and rinsing process starts.

As the bottles rotate into complete inversion the bottles 1 are forced by centrifugal force into the grippers 4, 24 and are therefore held absolutely reliably. The insertion pressure potentially acting upon the bottle bottom is introduced through the bottle head into the gripper 4 now disposed at the bottom. The clamping force and consequently the loading of the grippers 4, 24 can therefore be kept relatively small so that a long service life is ensured. When handling light weight plastic bottles, the lower gripper 24 can be omitted in many cases. It is desirable to dispose on the rotor an elastomeric bumper or stop 33 supporting the bottle 1 on the inside in the rotated position.

After injection of a jet of sterile water, for example, in bottles 1 in the grippers 4 and 24, the clamped bottles 1 are swivelled back 180 degrees to upright condition by the control device 10 so that they arrive at the outlet starwheel 8 in normal position. The bottles 1 then move while in the pockets of the outlet starwheel 8 and the guide arc 9 and their head end and body are moved gradually through the openings 12 or 28, respectively, and out from between the fingers of the grippers 4 or 24, respectively. In the process, the fingers 11a and 11b and fingers 26a and 26b through the contact with bottle 1 are initially opened slightly until the bottle 1 has completely exited from recesses 25 or 27, respectively, whereupon the fingers slide along bottle 1 and spring back into their undeflected and relaxed normal position. During this control process the bottles 1 are guided precisely in the region of the head by the upper starwheel plate and the upper arc and in the region of the body by the lower starwheel plate of the outlet star 8 and the lower guidance arc 9 and are standing on a slide rail 19. As shown in FIG. 2, the grippers 4 and 24 extend between the upper and lower plates of infeed starwheel 7 and outlet starwheel 8 and by guidance arc 9 so that the bottles 1 cannot tilt when entering or leaving grippers 4 and 24. Finally, the bottles 1 are transferred through the outlet starwheel 8 in their upright normal position to the conveying belt 17 and pass on to the filling and bottle capping machines which are not shown.

Figure 6:
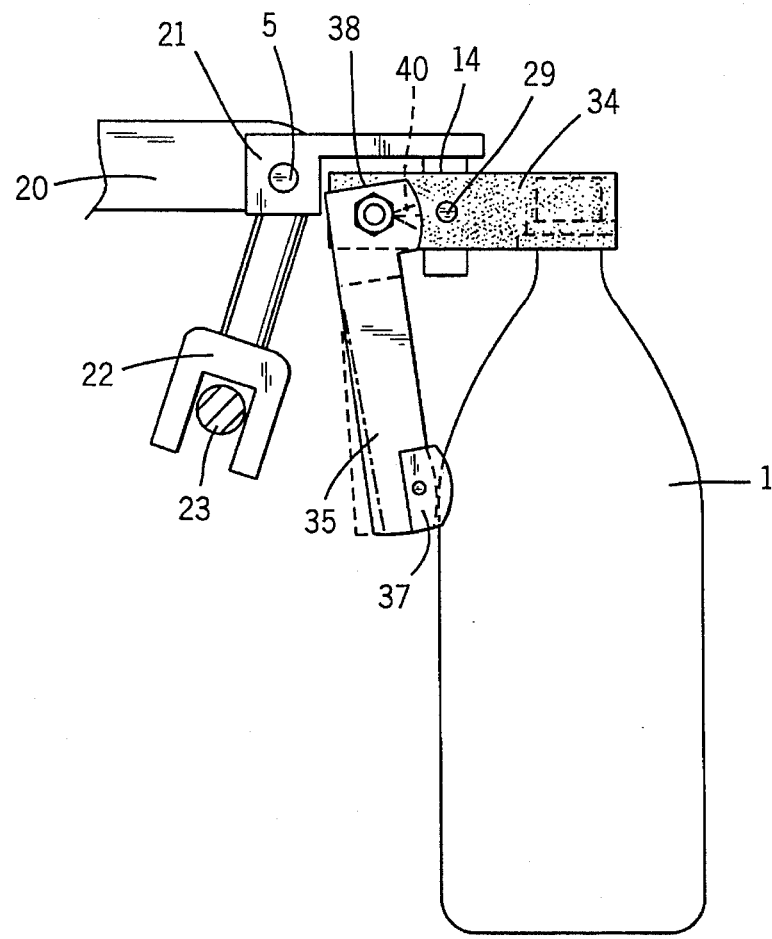
FIG. 6 is a side elevational view of an alternative embodiment of the new gripper device.
Figure 7:
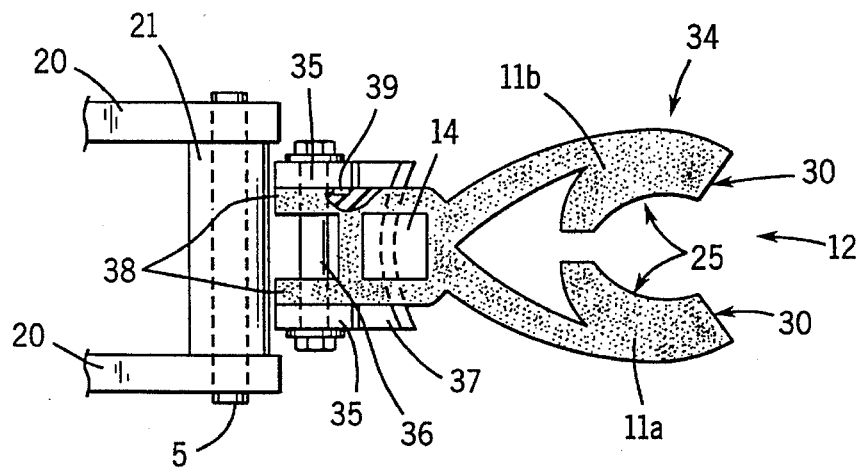
FIG. 7 is a top plan view of the gripper device shown in the preceding figure.

The slightly modified grippers 34 illustrated in FIGS. 6 and 7 have most features in common with the FIGS. 1 to 4 embodiment. Hence, only differences between them will be described. On the inside, directed toward the axis of rotation 3 of rotor 2, of the base part the gripper 34 is provided with two tongue-like parallel extensions 38 holes through which a horizontal bolt 36 is disposed so as to be tangential to the circumference of the rotor 2 or parallel to the swivel axis 5. The outer faces of extensions 38 are provided with three notch-like depressions 40 extending at three different angles with respect to the center axis of the bolt 36.

On gripper 34 is adjustably fastened a lever-like arm member 35 which in the normal position projects in the downward direction away from the single two finger gripper 34. For this purpose, the upper end of member 35 is implemented in the form of a fork and encompasses the gripper 34 on the outsides of both extensions 38. By means of two screws screwed into the bolt 36 the elastic synthetic material of which the forked ends of the arm member 35 are comprised is prestressed against the elastically resilient extensions 38 of the integral gripper 34 and simultaneously swivellably connected with gripper 34. On the insides of the forked ends of the arm member 35 and directed toward each other is formed a longitudinal wedge-form projection 39. The two projections 39 are flush with respect to one another in the same way as are the depressions 40 in gripper 34. In the position shown in FIG. 6, the two projections 39 engage the center depressions 40. This fixes the shown angular position between gripper 34 and arm member 35 through the elastic snap device formed by the projections 39 and depressions 40. Through manual swivelling of arm member 35 a change of the angular position is rapidly and effortlessly possible and the disengagement of the projections 39 from the depressions 40 is made possible through the intrinsic elasticity of extensions 38 and of the fork ends of arm member 35. The two other fixed angular positions of arm member 35 are indicated in dot-dash lines and are provided for bottles 1 with greater or smaller diameter.

At the lower end of arm member 35 a bracing saddle 37 is detachably fastened which extends at its working face directed toward the bottle 1, in a horizontal plane slightly concavely and in a perpendicular plane slightly convexly. The radius of curvature of the concave shape is at least as large as the radius of curvature of the greatest bottle 1 which is to be supported. The radius of curvature of the convex form is such that the saddle 37 is in good contact with all types of bottles to be handled.

In the FIGS. 6 and 7 embodiment described above, the centering and axial fixing of bottles 1 is effected exclusively through the form- and force-fit holding of bottle 1 in the elastic gripper 34. The arm member 35 or the bracing saddle 37, respectively, serve for the lateral support of bottle 1, in particular during the swivel motion from the upright into the inverted position of the bottle, and conversely. This embodiment is particularly suited for light weight bottles such as PET bottles and is realized especially simply and cost effectively accompanied by high operating reliability. The gripper 34 with arm member 35 forms a structural unit fixed detachably through a pin 29 on holder 14 and can be rapidly exchanged if necessary.

I claim:

1. A machine for cleaning an interior surface of receptacles that have an opening, the machine comprising:

a rotor drivable rotationally about a vertical axis and a plurality of nozzles arranged in circumferentially-spaced apart positions about said rotor for projecting respectively a jet of fluid upwardly, a plurality of devices arranged about said rotor in positions corresponding to said positions of said nozzles, said devices including at least one gripper for gripping a receptacle and a mechanism for swivelling a receptacle about a horizontal axis after said receptacle is gripped to thereby invert said receptacle and place its said opening over a said correspondingly positioned nozzle for receiving a jet of liquid, said gripper comprising two fingers having corresponding end portions connected to each other and are coupled to said mechanism and having opposite free corresponding end portions spaced from each other and having a region where said end portions of said fingers grip said receptacle, said fingers are comprised of elastic synthetic material to provide for said end portions to deflect apart elastically in response to a receptacle being inserted between said end portions for being gripped and in response to said receptacle being withdrawn from between said end portions of the fingers.

2. A machine according to claim 1 wherein the maximum spacing between said end portions of said fingers when unflexed is less than the size of said receptacle in the region in which said receptacle is gripped.

3. A machine according to claim 1 wherein said end portions of said fingers have tip extremities shaped according to a selected one of an oblique angulated shape or a rounded shape.

4. A machine according to claim 1 wherein said gripper comprises a base that couples to said mechanism and said base and fingers are a molded unit with said fingers extending from said base and said fingers and base are comprised of said elastic synthetic material.

5. A machine according to any one of claims 1, 2, 3, or 4, wherein said end portions of said respective fingers have recesses facing toward each other in said regions of said end portions of the fingers that grip said receptacle, and said recesses are shaped complementarily to the contour of said receptacle in the region on the receptacle at which said recesses grip said receptacle.

6. A machine according to claim 4 wherein:

said receptacle is a bottle having a generally cylindrical body and portion of portion of the bottle above and extending from the body tapers toward the axis of the body to form a neck region, said gripper is arranged for said fingers thereof to grip said neck region, an arm member (35) having an end region with a pivot connection to said base of said gripper, said arm member is disposed in juxtaposition to said bottle and terminates in a saddle (37) that bears on and supports said bottle during inversion thereof, and means for releasably setting said arm member in a pivoted position wherein said arm member bears against said bottle.

7. A machine according to claim 6 wherein said means for releasably setting said arm member in a pivoted position comprises a projection formed on a selected one of said arm member or said base and a series of depressions formed on the other of the said arm member or said base, said projection and depressions arranged radially spaced from said pivotal connection such that pivoting of said arm effects registration of said projection in a depression to set said arm at a pivoted angle wherein said saddle bears against said bottle.

8. A machine according to claim 1 wherein said receptacle is a bottle having a body and a neck and said opening is the mouth of the bottle, and there are two of said grippers, one of which has said end portions of its said fingers spaced apart when said fingers are unflexed only sufficiently for being flexed when said neck of said bottle passes between them and the other of said grippers has fingers whose end portions are spaced apart when said fingers are unflexed only sufficiently for being flexed when said body of the bottle passes between them.

9. A machine according to claim 8 including a holder to which each of said two grippers are attached and said holder is coupled to said mechanism for swivelling a receptacle.

10. A machine according to claim 9 including a member connecting said two grippers together as a unit such that one and the other of said grippers can be installed on and removed from said holder together.

11. A machine according to claim 1 including:

an infeed starwheel having equiangularly spaced apart pockets in the periphery thereof for receiving respectively receptacles in succession, a curved guide member arranged concentrically to said infeed starwheel and radially spaced from said starwheel sufficiently for receptacles being transported in said pockets to be held in the pockets, said curved guide member having a circumferential length that ends adjacent said rotor, and the receptacle in a pocket of said infeed starwheel and the angular positions of the pockets are synchronized with the angular positions of the grippers moving with said rotor such that said receptacles are forced in between said fingers of a gripper concurrently with a receptacle reaching said end of the guide member after which said receptacles are inverted.

12. A machine according to claim 1 characterized in that the fingers (11a and 11b) over one portion of their length a rectangular cross section and over another portion of their length an angular cross section with the recesses (25) adapted to the shape of the receptacle being implemented in the region with angular cross section.

13. A machine according to claim 1 wherein elongated metallic spring members are embedded in said fingers to increase their elastic force.

* * * * *